(12) United States Patent
Kang

(10) Patent No.: US 8,845,971 B2
(45) Date of Patent: Sep. 30, 2014

(54) APPARATUS FOR PURIFYING AND NEUTRALIZING TOXIC GASES

(75) Inventor: Yeon Kyun Kang, Dejeon (KR)

(73) Assignee: GT Scien Co., Ltd., Deajeon (KR)

( * ) Notice: Subject to any disclaimer, the term of this patent is extended or adjusted under 35 U.S.C. 154(b) by 724 days.

(21) Appl. No.: 13/129,852

(22) PCT Filed: Jul. 17, 2009

(86) PCT No.: PCT/KR2009/003967
§ 371 (c)(1),
(2), (4) Date: May 18, 2011

(87) PCT Pub. No.: WO2010/095790
PCT Pub. Date: Aug. 26, 2010

(65) Prior Publication Data
US 2011/0223071 A1  Sep. 15, 2011

(30) Foreign Application Priority Data

Feb. 18, 2009  (KR) ........................ 10-2009-0013526

(51) Int. Cl.
| | |
|---|---|
| *B01D 50/00* | (2006.01) |
| *B01D 53/00* | (2006.01) |
| *B01D 53/86* | (2006.01) |
| *B01D 46/10* | (2006.01) |
| *B01D 46/00* | (2006.01) |
| *B01D 53/04* | (2006.01) |

(52) U.S. Cl.
CPC .. *B01D 53/0407* (2013.01); *B01D 2255/20707* (2013.01); *B01D 2257/708* (2013.01); *B01D 2273/14* (2013.01); *B01D 53/8668* (2013.01); *B01D 46/10* (2013.01); *B01D 2259/4533* (2013.01); *B01D 46/0026* (2013.01); *B01D 53/869* (2013.01); *B01D 2253/102* (2013.01); *B01D 2255/204* (2013.01); *B01D 2253/311* (2013.01); *B01D 2253/1124* (2013.01); *B01D 2255/20784* (2013.01); *B01D 2255/2073* (2013.01); *B01D 2258/0216* (2013.01); *B01D 2255/2047* (2013.01); *B01D 2253/306* (2013.01); *B01D 46/0041* (2013.01); *B01D 46/0036* (2013.01); *B01D 2257/90* (2013.01); *B01D 2255/2092* (2013.01); *B01D 2255/202* (2013.01); *B01D 2259/455* (2013.01); *B01D 46/0023* (2013.01); *B01D 2273/30* (2013.01); *B01D 2258/06* (2013.01); *B01D 2259/4508* (2013.01)
USPC ................ 422/122; 96/134; 96/142; 422/169

(58) Field of Classification Search
CPC .. A61L 9/16; B01D 46/0023; B01D 46/0026; B01D 46/0036; B01D 46/0041; B01D 46/10; B01D 53/0407; B01D 53/8668; B01D 53/869; B01D 53/74; B01D 53/75; B01D 2258/0216; B01D 2258/06; B01D 2259/4508
USPC ........ 422/4, 120, 122, 169, 171; 96/132, 134, 96/135, 142
See application file for complete search history.

(56) References Cited

U.S. PATENT DOCUMENTS

| | | | | |
|---|---|---|---|---|
| 3,804,942 A | * | 4/1974 | Kato et al. .................... | 422/122 |
| 5,221,520 A | * | 6/1993 | Cornwell ...................... | 422/122 |
| 5,904,896 A | * | 5/1999 | High ............................ | 422/122 |
| 6,280,691 B1 | * | 8/2001 | Homeyer et al. ............ | 422/122 |
| 6,680,028 B1 | * | 1/2004 | Harris .......................... | 422/122 |
| 7,045,000 B2 | | 5/2006 | Kim | |
| 7,258,728 B2 | * | 8/2007 | Lim et al. ....................... | 95/287 |
| 7,651,555 B2 | * | 1/2010 | Roseberry et al. ............ | 422/122 |
| 2005/0066818 A1 | | 3/2005 | Kim | |
| 2005/0089455 A1 | * | 4/2005 | Marganski et al. ........... | 422/168 |

FOREIGN PATENT DOCUMENTS

| | | |
|---|---|---|
| KR | 10-2004-0092811 A | 11/2004 |
| KR | 10-2004-0107953 A | 12/2004 |
| KR | 10-2005-0031190 A | 4/2005 |
| KR | 10-2006-0104030 A | 10/2006 |
| KR | 10-2008-0114153 A | 12/2008 |

OTHER PUBLICATIONS

English language abstract of KR 10-2004-0107953A.
English language abstract of KR 10-2005-0031190 A.
English language abstract of KR 10-2008-0114153 A.
English language abstract of KR 10-2004-0092811 A.
English language abstract of KR 10-2006-0104030 A.

* cited by examiner

*Primary Examiner* — Jill Warden
*Assistant Examiner* — Joye L Woodward
(74) *Attorney, Agent, or Firm* — Rabin & Berdo, P.C.

(57) ABSTRACT

An apparatus for purifying and neutralizing toxic gases such as odors, fumes or various volatile organic compounds generated by research laboratories, chemical processing factories or hospitals where medicinal products are handled, comprises a main body having an intake, an exhaust and a control panel; a pre-filter, a first filter, first and second neutralizing pellet beds, and a second filter which are mounted in the apparatus main body and are placed from the intake to the exhaust in that order; and a blower and a driving device placed between the first and second neutralizing pellet beds. The apparatus effectively purifies and neutralizes toxic gases and collects fine particles or dust.

12 Claims, 3 Drawing Sheets

APPARATUS FOR PURIFYING AND NEUTRALIZING TOXIC GASES

CROSS-REFERENCE TO RELATED APPLICATIONS

The present application claims priority under 35 U.S.C. 119 to Korean Patent Application No. 10-2009-0013526, filed on Feb. 18, 2011, the disclosure of which is expressly incorporated by reference herein in its entirety.

TECHNICAL FIELD

The present invention relates to an apparatus for effectively purifying and neutralizing toxic gases such as odors, fumes or various volatile organic compounds generated by research laboratories of a college, an enterprise, or a research institute etc., semiconductor or chemical products manufacturing factories or hospitals etc. where medicinal products are handled. More particularly, the present invention relates to a movable or stand type apparatus of an independent form for effectively purifying and neutralizing toxic gases having a purifying filter, a neutralizing pellet bed, and a blower therein.

BACKGROUND ART

In general, a conventional apparatus for purifying and neutralizing toxic gases is mainly used in a thermal power generation plant, a waste disposal facility, a mass combustion air generating plant, or a semiconductor manufacturing plant using a dry etching process, etc. as a large-scale equipment of a fixing type.

The conventional apparatus for purifying and neutralizing toxic gases can be classified into a dry apparatus and a wet apparatus. Here, the dry apparatus for purifying and neutralizing toxic gases is equipped with a dust collecting and removing device using a high voltage, a incinerator for pyrolyzing the toxic ingredients, and filters. Also, the wet apparatus for purifying and neutralizing toxic gases is equipped with a toxic ingredient collecting device, a neutralizing device, and a waste water treating device besides the above devices of the dry apparatus.

These apparatuses are massive outdoor equipments for purifying and/or neutralizing the combustion and toxic gases that treat the combustion gases generated from a combustion furnace or an incinerator or the toxic gases generated from a dry etching process equipment to discharge them to outside. However, they do not relate to a movable or stand type indoor apparatus of a small scale for effectively purifying and neutralizing toxic gases having an independent form.

In the meantime, recently, an air cleaner or an air purifier released for household purposes are the movable or stand type indoor apparatus of a small scale having the independent form. However, since these cleaners have original purposes and functions for purifying the indoor air in a residential space such as the house or office etc., they are irrelevant to the toxic gases purifying and neutralizing treatment. That is, they have the dust collecting and removing function as the main purpose and have an anion generating function, a fragrancing function, a deodorizing function, a microbial sterilizing function using a UV lamp or a nano-silver filter as additional purposes so as to only comfortably purifying the indoor air of the home or office. However, they are not the apparatus capable of purifying and neutralizing the harm or toxic gases, considering the structure and functions thereof.

DISCLOSURE

Technical Problem

Therefore, the present invention has been made in view of the above-mentioned problems, and the primary object of the present invention is to provide an apparatus for effectively purifying and neutralizing toxic gases such as odors, fumes or various volatile organic compounds generated by research laboratories of a college, a enterprise, or a research institute, chemical processing factories or hospitals where medicinal products are handled.

A second object of the present invention is to provide an apparatus for purifying and neutralizing toxic gases capable of collecting fine particles or dusts and having a high neutralizing efficiency on harm gases and a high maintenance thereof.

A third object of the present invention is to provide an apparatus for purifying and neutralizing toxic gases in that an additional connection of other facilities or pipes is not required, so that the apparatus has a high usability due to the independent compact form and function thereof.

A fourth object of the present invention is to provide an apparatus for purifying and neutralizing toxic gases capable of being silently driven in with less noise.

A fifth object of the present invention is to provide an apparatus for purifying and neutralizing toxic gases in that the apparatus can be easily approached to a toxic gas source and a toxic gas intake can be rotated 360 degrees and moved while it adjusts the distance thereof, so that the toxic gases can be effectively purified and neutralized in specific and partial areas of the indoor.

A sixth object of the present invention is to provide a stand type apparatus for purifying and neutralizing toxic gases.

Technical Solution

In accordance with an aspect of the present invention to achieve the first to fourth objects thereof, there is provided an apparatus for purifying and neutralizing toxic gases comprising:

a main body having an intake, an exhaust and a control panel; a pre-filter, a first filter, a neutralizing pellet bed, and a second filter which are mounted in the main body and are placed from the intake to the exhaust in order; and a blower and a driving device placed between the neutralizing pellet bed and the second filter or the first filter and the neutralizing pellet bed.

In accordance with another aspect of the present invention to achieve the first to fourth objects thereof, the neutralizing pellet bed comprises first and second neutralizing pellet beds and the blower and the driving device are placed between the first and second neutralizing pellet beds.

In accordance with further another aspect of the present invention to achieve the first to fourth objects thereof, the first filter is a HEPA (High Efficiency Particulated Arrestor) filter or an ULPA (Ultra Low Penetration Absolute) filter; the second filter is a non-woven fabric filter added with solid particles of activated charcoal and a basic metal oxide, or a non-woven activated carbon fiber filter added with a basic metal oxide; and the neutralizing pellet bed comprises a first pellet which consists of an adsorbent, a basic metal oxide and an amphoteric metal oxide, a second pellet which consists of a basic metal oxide, an oxidant and an amphoteric metal oxide, and a third pellet which consists of a basic metal oxide and an amphoteric metal oxide, the first pellet, the second pellet and the third pellet being layered orderly, or mixed randomly in a weight ratio of 1:1-5:3-10, preferably 1:2-4:5-7.

In accordance with further another aspect of the present invention to achieve the first to fourth objects thereof, the basic metal oxide is at least one member selected from a group consisting of $Na_2O$, $K_2O$, $Rb_2O$, $Cs_2O$, MgO, CaO, SrO, BaO, CrO, $Ti_2O_3$, $Cr_2O_3$, MnO and $Mn_2O_3$; the amphoteric metal oxide is at least one member selected from a group consisting of $Al_2O_3$, $SnO_2$ and $PbO_2$; the oxidant is $KMnO_4$, $MnO_2$, or $PbO_2$; and the adsorbent is an activated charcoal.

In accordance with further another aspect of the present invention to achieve the fifth object thereof, the intake is a cone-shaped intake communicated with a flexible pipe, which is formed on an upper surface of the main body, the exhaust is formed on a lower portion of the main body, the control panel is the upper surface or a front surface of the main body, a grip is formed on one side of the upper surface of the main body, and a caster is formed on a lower portion of the main body.

In accordance with further another aspect of the present invention to achieve the fifth object thereof, a grip pin is formed at an upper end portion of the cone-shaped intake communicated with the flexible pipe.

In accordance with further another aspect of the present invention to achieve the sixth object thereof, the intake has a plurality of guide pins formed at an upper portion of a front surface of the main body, the exhaust has a plurality of other guide pins formed at a lower portion of the front surface of the main body, the control panel is formed on the front surface of the main body, and a height adjustor is formed on a lower surface of the main body.

In accordance with further another aspect of the present invention to achieve the sixth object thereof, the intake has a plurality of guide pins formed at a lower portion of a front surface of the main body, the exhaust has a plurality of other guide pins formed at an upper portion of the front surface of the main body, the control panel is formed on the front surface of the main body, and a height adjustor is formed on a lower surface of the main body.

Advantageous Effects

The present invention as described above has advantageous effects in that the toxic gases such as odors, fumes or various volatile organic compounds generated by research laboratories of a college, a enterprise, or a research institute, chemical processing factories or hospitals where medicinal products are handled can be effectively purified and neutralized, the fine particles and dusts can be effectively collected, so that the apparatus helps to maintain the health of the researchers, the peoples who perform the experiments, the workers in chemical factories, or the medical workers, the filter and neutralizing pellet bed are configured in a cartridge form, so that the apparatus is high-maintenance, the additional connection of other facilities or pipes is not required, so that the apparatus has a high usability due to the independent compact form and function thereof, the apparatus can be silently driven in with less noise, and especially, after the apparatus is moved to the toxic gas source in case of a movable type apparatus, the toxic gas intake, which is communicated with a flexible pipe, can be rotated 360 degrees and moved while it adjusts the distance thereof, so that the toxic gases can be effectively and conveniently purified and neutralized in specific and partial areas of the indoor.

BRIEF DESCRIPTION OF THE DRAWINGS

The foregoing and other objects, features and advantages of the present invention will become more apparent from the following detailed description when taken in conjunction with the accompanying drawings in which.

DESCRIPTIONS ON REFERENCE NUMBERS FOR THE MAJOR COMPONENTS IN THE DRAWINGS

| | |
|---|---|
| 1, 1a, and 1b: Apparatuses for purifying and neutralizing toxic gases according to the present invention | |
| 2: Pre-filter | 3: First Filter |
| 4 and 5: Neutralizing Pellet Bed | |
| 6: Second Filter | |
| 10: Main Body | 11: Front Surface |
| 12: Side Surface | 13: Upper Surface |
| 13a: Ring-shaped Protruding Part | |
| 13b: Grip | 14: Lower Surface |
| 15: Intake | 15a: Guide Pin |
| 16: Exhaust | 16a: Guide Pin |
| 17: Caster | 17a: Caster holder |
| 17b: Height Adjustor | 18: Control Panel |
| 20: Blower | 21: Driving Device (Motor) |
| 30: Flexible Pipe | |
| 31 and 32: Connector | 33: Cone-shaped Intake |
| 34: Grip Pin | |

Best Mode

Mode For Invention

Hereinafter, exemplary embodiments of the present invention will be described in detail with reference to the accompanying drawings.

Figure 1:
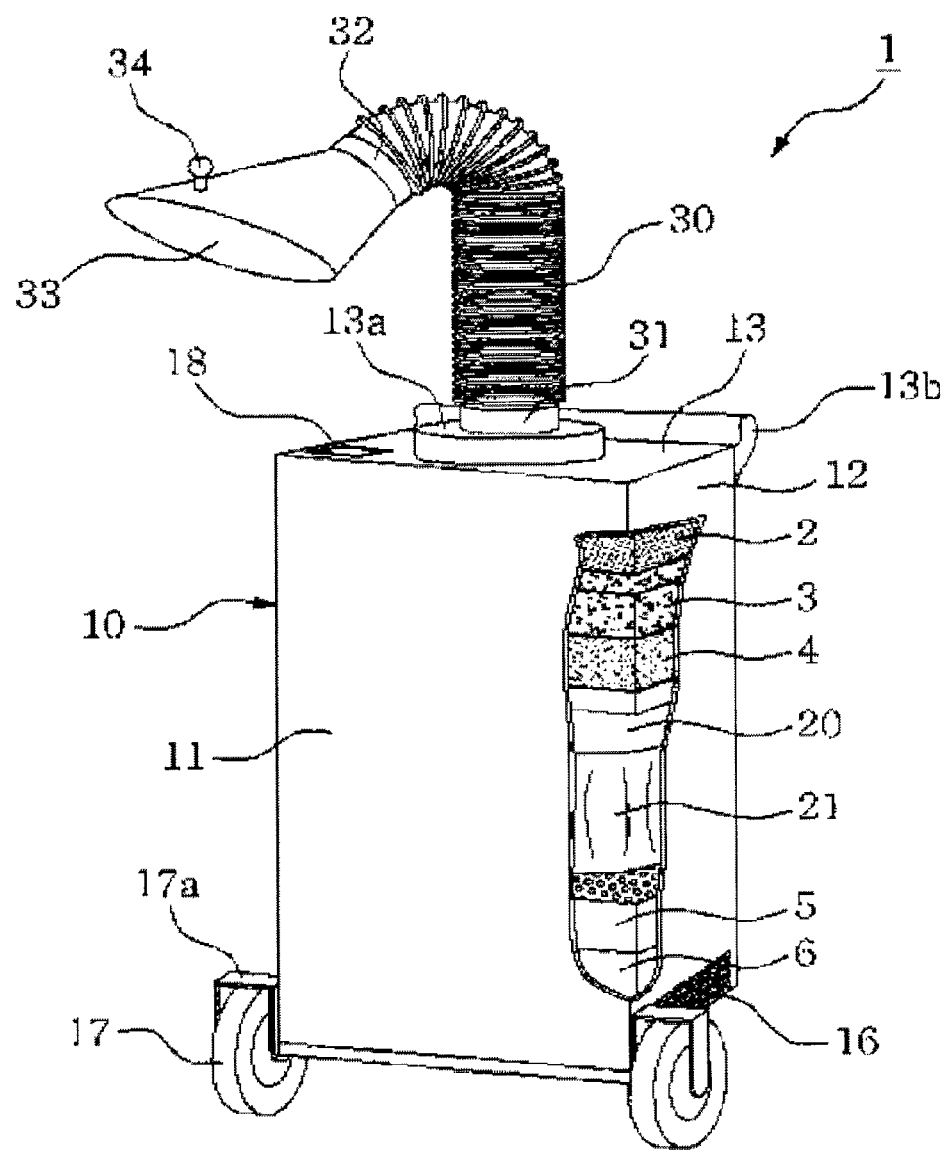
FIG. 1 is a partially cut perspective view illustrating a movable apparatus for purifying and neutralizing toxic gases according to one embodiment of the present invention.
Figure 2:
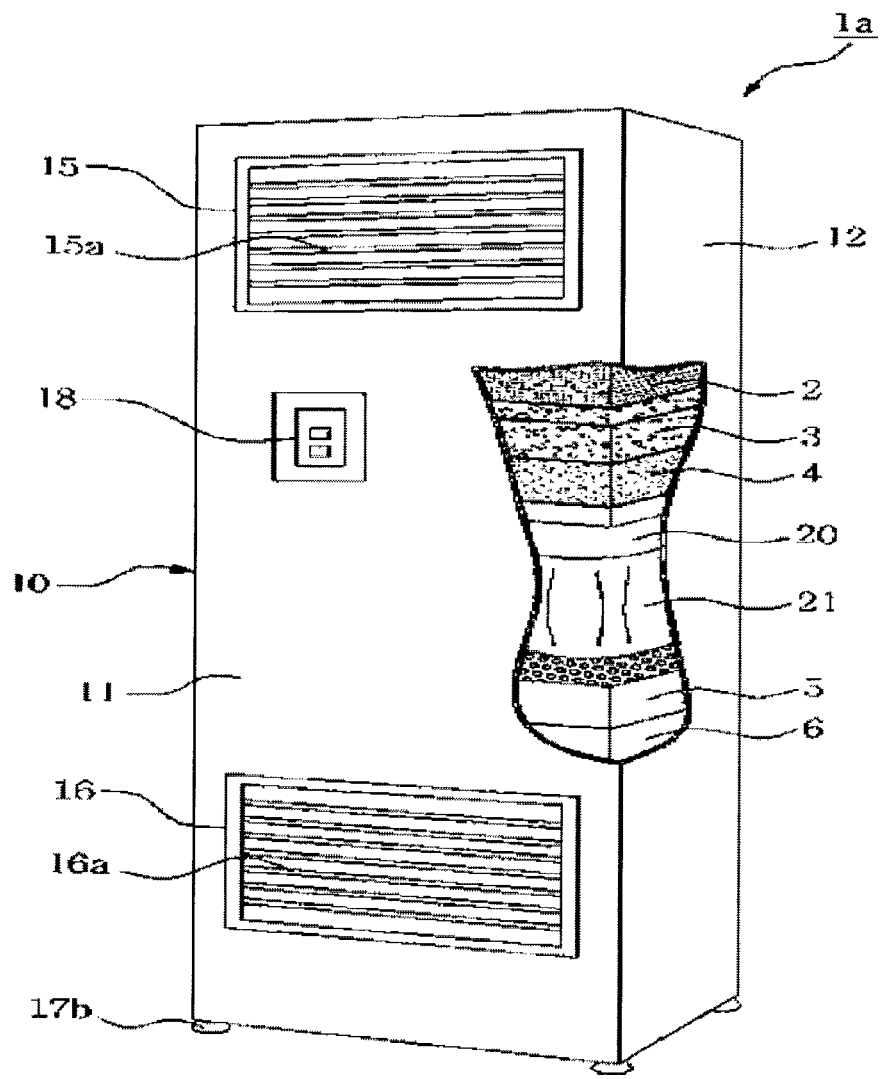
FIG. 2 is a partially cut perspective view illustrating a stand type apparatus for purifying and neutralizing toxic gases according to another embodiment of the present invention.
Figure 3:
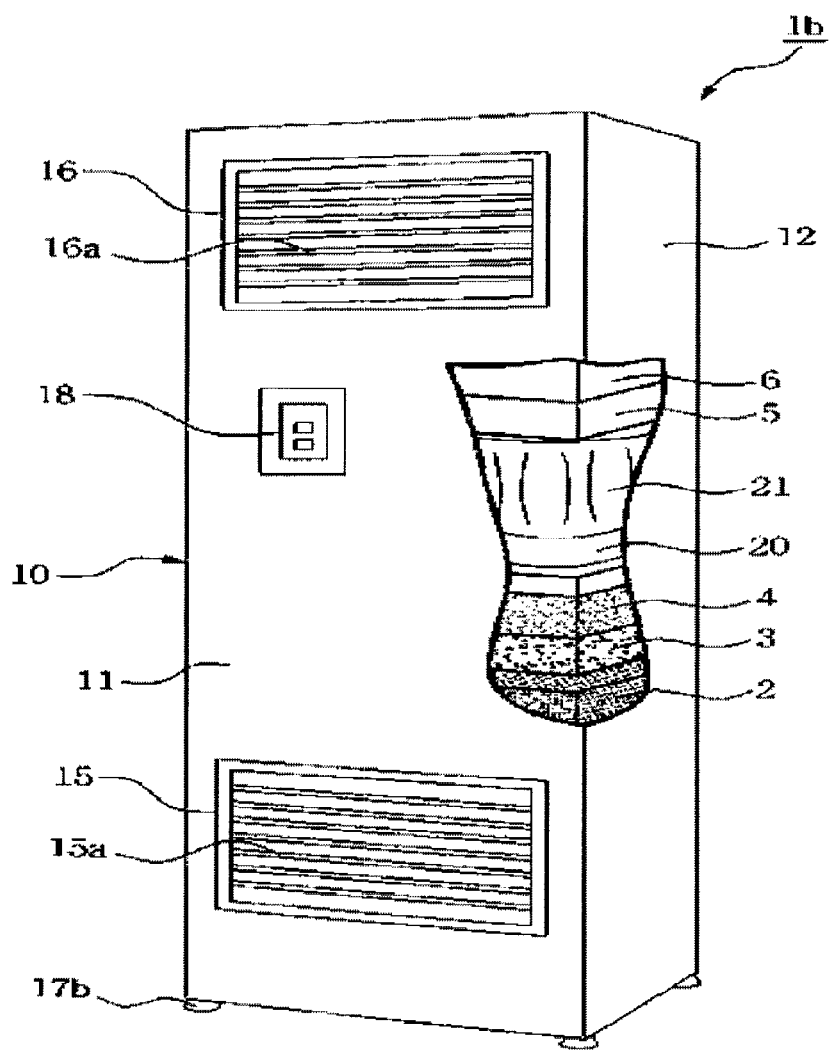
FIG. 3 is a partially cut perspective views illustrating a stand type apparatus for purifying and neutralizing toxic gases according to further another embodiment of the present invention.

FIG. 1 is a partially cut perspective view illustrating an apparatus 1 for purifying and neutralizing toxic gases according to one embodiment of the present invention and FIG. 2 and FIG. 3 are partially cut perspective views illustrating apparatuses 1a and 1b for purifying and neutralizing toxic gases according to other embodiments of the present invention. Since all of the filter and beds formed in a main body 10 are actually identical, the same parts are mentioned together for convenience.

The apparatuses 1, 1a, and 1b for purifying and neutralizing toxic gases according to the present invention include a main body 10 having an intake 15 or 33, an exhaust 16 and a control panel 18; a pre-filter 2, a first filter 3, first and second neutralizing pellet beds 4 and 5, and a second filter 6 which are mounted in the main body 10 and are placed from the intake 15 or 33 to the exhaust 16 in order; and a blower 20 and a driving device 21 placed between the first and second neutralizing pellet beds 4 and 5.

Here, it is preferred that the neutralizing pellet beds are two neutralizing pellet beds, that is, the first neutralizing pellet beds 4 and the second neutralizing pellet beds 4 and 5. However, there is no need to have two neutralizing pellet beds. That is, any one of those can be omitted in certain circumstances. In this case, the blower 20 and the driving device 21 are placed between the first neutralizing pellet bed 4 and the second filter 6 or the first filter 3 and the second neutralizing pellet bed 5.

Hereinafter, the pre-filter 2, the first filter 3, the first and second neutralizing pellet beds 4 and 5, and the second filter 6 configured in the cartridge form will be concretely explained in the apparatuses 1, 1a, and 1b for purifying and neutralizing toxic gases according to the present invention.

First, the pre-filter 2 can be made of reusable non-woven fiber such as polyvinyl chloride (PVC), polyethylene (PE) or polypropylene (PP). The pre-filter 2 can be porous sponge filter, or reusable glass fiber filter. It is preferred that the pre-filter 2 has a high dust collection efficiency of 60-85%, and a low initial pressure drop of 5.5-8.5 mmAq($H_2O$). The pre-filter 2 is for reducing the load on the first filter 3.

The first filter 3 is a HEPA (High Efficiency Particulated Arrestor) filter or an ULPA (Ultra Low Penetration Absolute) filter, which are already known.

The HEPA filter is made of micro glass fiber, being used to control particles as small as 0.3 μm. The HEPA filter has a minimum efficiency of 99.7%, preferably 99.97% according to a DOP (dioctylphthalate) method. The HEPA filter has an initial pressure drop of 24-26 mmAq and a final pressure drop of 46-55 mmAq.

In the meantime, the ULPA filter can be made of an ultra micro glass fiber. The ULPA filter has a minimum efficiency of 99.99%, preferably 99.9995% according to the DOP (dioctylphthalate) method (0.1-0.17 μm). The ULPA filter has an initial pressure drop of 25-27 mmAq and a final pressure drop of 50-58 mmAq.

In the present invention, the first filter 3 can be appropriately selected from any one of the HEPA filter and the ULPA filter according to use, place of installation and purpose thereof. For an ordinary use, the HEPA filter may be generally selected in view of cost and easiness of maintenance.

The Neutralizing pellet beds 4 and 5 used in the apparatus for purifying and neutralizing toxic gases 1, 1a, and 1b of the present invention are beds which comprise a first pellet which consists of adsorbent, basic metal oxide and amphoteric metal oxide, a second pellet which consists of basic metal oxide, oxidant and amphoteric metal oxide, and a third pellet which consists of basic metal oxide and amphoteric metal oxide, wherein the first pellet, the second pellet and the third pellets are layered orderly in a separated way by a wall (not shown), or mixed randomly in a weight ratio of 1:1-5:3-10, preferably 1:2-4:5-7. The neutralizing pellet beds are stored in a cartridge (not shown) which has many small pores on the surface.

The activated charcoal is used as the said adsorbent.

As the basic metal oxide which reacts with an acid to form a salt, a typical metal oxide or transition metal oxide in low oxidation state are used. Specifically $Na_2O$, $K_2O$, $Rb_2O$, $Cs_2O$, MgO, CaO, SrO, BaO, CrO, $Ti_2O_3$, $Cr_2O_3$, MnO, $Mn_2O_3$ or a random mixture thereof, preferably alkali metal oxide or alkali earth metal oxide, more preferably $Na_2O$ is used as the basic metal oxide.

As the amphoteric metal oxide which reacts with acid and base to form salt, a metalloid oxide or transition metal oxide can be used. Specifically $Al_2O_3$, $SnO_2$, $PbO_2$ or a random mixture thereof, preferably $Al_2O_3$ which functions as a catalyst, adsorbent and pellet support can be used.

As the oxidant, $KMnO_4$, $MnO_2$ or $PbO_2$ can be used. Preferably, $KMnO_4$ or $MnO_2$ can be used in view of safety and easiness of maintenance, and more preferably strong oxidant $KMnO_4$ can be used.

In the present invention, selectively, the first pellet may consist of 50-65 wt % of adsorbent, 15-30 wt % of basic metal oxide, 5-15 wt % of amphoteric metal oxide and 5-15 wt % of binder. The said second pellet may consist of 25-40 wt % of basic metal oxide, 25-40 wt % of oxidant, 25-40 wt % of amphoteric metal oxide and 5-15 wt % of binder. The said third pellet may consist of 50-70 wt % of basic metal oxide, 20-40 wt % of amphoteric metal oxide and 5-15 wt % of binder. The said first pellet, second pellet and third pellet can be used in a weight ratio of 1:1-5:3-10, preferably in a weight ratio of 1:2-4:5-7. The said first pellet, second pellet and third pellet are layered orderly in a separate way by wall, or are stored randomly mixed in a cartridge which has many small pores on the surface, and form a fluidized pellet bed.

Meanwhile, in the present invention, when both neutralizing pellet beds 4 and 5 are used together, both pellet beds may be the same each other or different each other, within the above range of ingredients and ratio.

As a binder for pelletization, any ceramic binder can be used without any limit, such as silica sol (4.3-7.3 wt %), CMC (Sodium Carboxy Methyl Cellulose) or pulp particles (4.7-7.3 wt %).

The ingredients are ball milled to about 150-1200 mesh, then applied to pelletizing machine to form pellets of any desired shape and size.

In the present invention, the first pellet, the second pellet and third pellet have a moisture content not greater than 5%.

Also, the pore volume of the first pellet is in a range of 1.91-2.17 cc/g, the BET surface area is in a range of 920-970 $m^2$/g, and the pressure drop in a range of 8.8-9.3 mmAq/(5 cm). The pore volume of the second pellet is in a range of 1.02-1.18 cc/g, the BET surface area is in a range of 766-792 $m^2$/g, and the pressure drop is in a range of 7.6-8.4 mmAq/(5 cm). The pore volume of the third pellet is in a range of 1.57-1.69 cc/g, the BET surface area is in a range of 788-823 $m^2$/g, and the pressure drop is in a range of 7.7-8.2 mmAq/(5 cm).

Then, a non-woven fabric filter added with solid particles of activated charcoal and basic metal oxide, or a non-woven activated carbon fiber filter added with basic metal oxide can be used as the second filter 6. When the non-woven natural fiber fabric filter or non-woven synthetic fiber filter described in the pre-filter part is used, the non-woven fabric filter is the filter which is coated and fixed with 70-85 wt % of activated charcoal, 10-25 wt % of basic metal oxide and 3-8 wt % of binder uniformly. When a non-woven activated carbon fiber filter added with basic metal oxide is used, the non-woven fabric filter is the filter which is coated and fixed with 80-95 wt % of basic metal oxide and 5-20 wt % of binder uniformly.

Here, describing about non-woven activated carbon fiber fabric of this invention in detail, the single fiber diameter is in a range of 5-20 μm, the volume density is in a range of 0.03-0.07 g/$m^3$, the ash contends in a range of 0.1-0.5%, and the specific surface area is in a range of 900-1600 $m^2$/g, preferably in a range of 1100-1550 $m^2$/g. The pore volume is in a range of 0.3-0.7 $m^3$/g, the adsorption rate of benzene is in a range of 35-80%, the pore diameter is less than 14 Å. The adsorption rate of non woven activated carbon fiber fabric is more than 100 times faster than the adsorption rate of activated charcoal particles. It is preferred that adsorption heat is not released and the purity is almost 100%. Such non-woven activated carbon fiber fabric has the high rate of adsorption/desorption, and possesses high surface area that has great adsorption capacity. It has long durability and easiness of maintenance and regeneration. The general physical properties of non-woven activated carbon fiber filter that can be obtained commercially are as follows. The density is in a range of 100-300 g/m³, the thickness is in a range of 1-6 mm, and the volume density is in a range of 0.04-0.1 g/cm³.

The non-woven active carbon fiber filter can be made by activation process. The carbonization of carbon fiber is performed by carbonizing at a temperature of 900-1300° C. for about 30-150 min, in an atmosphere of an inert gas, such as nitrogen. Then the activation gas, such as steam, $O_2$, CO or $CO_2$ is introduced into the activation chamber with varying temperature and time to enhance the adsorption capacity of hydrophilic toxic/hazardous materials.

The repair cycle of the pre-filter 2, the first filter 3, the first and second neutralizing pellet beds 4 and 5, and the second filter 6 applied to the apparatuses 1, 1a, and 1b for purifying and neutralizing toxic gases according to the present invention is about one year based on 8 hours per day, depending on a service place or a contamination level thereof.

In the meantime, the blower 20 and the driving device 21 such as a motor applied to the apparatuses 1, 1a, and 1b for purifying and neutralizing toxic gases according to the present invention are placed between the first neutralizing pellet bed 4 and the second neutralizing pellet bed 5 so as to alleviate a pressure loss. Here, where any one of two neutralizing pellet beds 4 and 5 is formed therein, as described above, the blower 20 and the driving device 21 are placed between the first neutralizing pellet beds 4 and the second filter 6 or the first filter 3 and the second neutralizing pellet bed 5. This is an important matter in the present invention.

Hereinafter, the detailed structure of the apparatuses 1, 1a, and 1b for purifying and neutralizing toxic gases according to the present invention will be amplified with reference to the accompanying drawings.

Firstly, as shown in FIG. 1, the movable apparatus 1 for purifying and neutralizing toxic gases according to one embodiment of present invention includes a ring-shaped protruding part 13a having an opening (not shown) is formed on a center of an upper surface 13 of a box type main body 10 and a flexible pipe 30 having one end thereof mounted on the ring-shaped protruding part 13a through a connector 31 and other end thereof mounted on a cone-shaped intake 33 through another connector 32.

Accordingly, the cone-shaped intake 33 can be rotated 360 degrees and moved while it adjusts the distance thereof, so that the cone-shaped intake 33 can approach a desired partial area.

Here, a sphere-shaped or a T-shaped grip pin 34 is formed at an upper end portion of the cone-shaped intake 33, so that the user can easily induce the cone-shaped intake 33 in arbitrary direction and location in a state that he slightly grips it with his one hand.

In the meantime, as shown in FIG. 1, a control panel 18 is formed on the upper surface of the main body 10. Here, on/off switches are attached to the control panel 18. If necessary, the control panel 18 can be provided with a timer, a toxic gas concentration sensor, a display portion, a micro control etc. However, these can be randomly selected in the present invention. Also, it goes without saying that the control panel 18 can be formed on the front surface of the main body 10.

As shown in FIG. 1, a grip 13b is formed on one side of the upper surface of the main body 10. The shape and size of the grip 13b can be randomly selected in the present invention.

Also, a caster 17 for easily moving the apparatus is formed on an arbitrary position of the lower portion of the main body 10. As shown, two caster holders 17a are formed on lower end portions of both side surfaces 12 of the main body 10. However, this is randomly selected. Here, in order to easily move the apparatus, it is preferred that the rear casters 17 are fixed thereto and front casters (not shown) are rotated right and left thereto, thereby it can be easily rotated right and left by means of the grip 13b during the moving of the apparatus.

As shown, the exhaust 16 having a plurality of air vent holes is formed at the lower portions of both side surfaces 12 of the main body 10. However, the present invention is not limited to it and the position and shape thereof can be randomly selected under the condition that the exhaust 16 is formed on the lower portion of the second filter 6.

Since the pre-filter 2, the first filter 3, the first neutralizing pellet bed 4, the blower 20, the driving device 21, the second neutralizing pellet bed 4, and the second filter 6, which are placed from the intake 33 to the exhaust 16 in order, were explained enough, further descriptions on these are omitted here. However, it is preferred that a safety filter (not shown), which is consist of a metal mesh etc., is mounted in the ring-shaped protruding part 13a of the upper surface 13 of the main body 10 so as to prevent big or sharp external materials from being sucked into the inside of the main body 10 through the blower 20.

Continuously, as shown in FIG. 2, the stand type apparatus 1a for purifying and neutralizing toxic gases according to another embodiment of the present invention includes the intake 15 having a plurality of guide pins 15a formed at the upper portion of the front surface 11 of the main body 10, and the exhaust 16 having a plurality of other guide pins 16a formed at the lower portion of the front surface 11 of the main body 10; and the first filter 3, the first neutralizing pellet bed 4, the blower 20, the driving device 21, the second neutralizing pellet bed 4, and the second filter 6, placed from the intake 15 to the exhaust 16 in order as described above.

Also, the control panel 18 is formed on the front surface 11 of the main body 10 and a height adjustor 17b is mounted on the lower surface of the main body 10 so as to adjust the height and level thereof. The control panel 18 of FIG. 2 is the same as that of FIG. 1 as described above.

In the meantime, as shown in FIG. 3, the stand type apparatus 1b for purifying and neutralizing toxic gases according to further another embodiment of the present invention is essentially the same as that of FIG. 2 except that the apparatus 1b of FIG. 2 is inverted in the structure thereof. This structure is suitable for a clean room in that the dust materials of the floor can be floated in a case that the exhaust 16 for discharging the purified and neutralized airs is located in the lower portion of the apparatus.

As shown in FIG. 3, the stand type apparatus 1b for purifying and neutralizing toxic gases according to another embodiment of the present invention includes the intake 15 having the plurality of guide pins 15a formed at the lower portion of the front surface 11 of the main body 10, and the exhaust 16 having the plurality of other guide pins 16a formed at the upper portion of the front surface 11 of the main body 10; and the first filter 3, the first neutralizing pellet bed 4, the blower 20, the driving device 21, the second neutralizing pellet bed 4, and the second filter 6, placed from the intake 15 to the exhaust 16 in order as described above.

Also, the control panel 18 and the height adjustor 17b of FIG. 3 is the same as those of FIG. 2 as described above.

The driving device 21, which is mounted in the apparatuses 1, 1a, and 1b for purifying and neutralizing toxic gases according to the present invention is strongly fixed to a frame (not shown) of the main body 10. Preferably, the driving device 21 is provided with a vibration preventing pad (not shown) and a chip board (not shown) for noise absorption as an inner plate, so that the apparatus can be silently driven in with less noise. Also, it is preferred that a plurality of metal stiffeners for vibrating prevention is longitudinally attached to a back surface of a metal plate of the main body 10 in a proper place.

In the meantime, the pre-filter 2, the first filter 3, and the second filter 6 are manufactured in the cartridge form having a frame and the first and second neutralizing pellet beds 4 and 5 are manufactured in the cartridge form having a plurality of air vent holes, so that the replacement work can be simply and easily performed.

Although several exemplary embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. An apparatus for purifying and neutralizing toxic gases comprising:
a main body having an intake, an exhaust and a control panel;
a pre-filter, a first filter, a neutralizing pellet bed, and a second filter which are mounted in the main body and are placed from the intake to the exhaust in order; and
a blower and a driving device placed between the neutralizing pellet bed and the second filter or the first filter and the neutralizing pellet bed;
wherein the first filter is a HEPA (High Efficiency Particulated Arrestor) filter or an ULPA (Ultra Low Penetration Absolute) filter; the second filter is a non-woven fabric filter added with solid particles of activated charcoal and a basic metal oxide, or a non-woven activated carbon fiber filter added with a basic metal oxide;and the neutralizing pellet bed comprises a first pellet which consists of an adsorbent, a basic metal oxide and an amphoteric metal oxide, a second pellet which consists of a basic metal oxide, an oxidant and an amphoteric metal oxide, and a third pellet which consists of a basic metal oxide and an amphoteric metal oxide, the first pellet, the second pellet and the third pellet being layered orderly, or mixed randomly in a weight ratio of 1:1-5:3-10.

2. The apparatus for purifying and neutralizing toxic gases as recited in claim 1, wherein the neutralizing pellet bed comprises first and second neutralizing pellet beds and the blower and the driving device are placed between the first and second neutralizing pellet beds.

3. The apparatus for purifying and neutralizing toxic gases as recited in claim 1, wherein the basic metal oxide is at least one member selected from a group consisting of Na2O, K2O, Rb2O, Cs2O, MgO, CaO, SrO, BaO, CrO, Ti2O3, Cr2O3, MnO and Mn2O3; the amphoteric metal oxide is at least one member selected from a group consisting of Al2O3, SnO2 and PbO2; the oxidant is KMnO4, MnO2, or PbO2; and the adsorbent is an activated charcoal.

4. The apparatus for purifying and neutralizing toxic gases as recited in claim 3, wherein the basic metal oxide is Na2O, the amphoteric metal oxide is Al2O3, and the oxidant is KMnO4.

5. The apparatus for purifying and neutralizing toxic gases as recited in claim 1, wherein the first pellet consists of 50-65 wt % of the adsorbent, 15-30 wt % of the basic metal oxide, 5-15 wt % of the amphoteric metal oxide, and 5-15 wt % of a binder; the second pellet consists of 25-40 wt % of the basic metal oxide, 25-40 wt % of the oxidant, 25-40 wt % of the amphoteric metal oxide, and 5-15 wt % of the binder; and the third pellet consists of 50-70 wt % of the basic metal oxide, 20-40 wt % of the amphoteric metal oxide and 5-15 wt % of the binder.

6. The apparatus for purifying and neutralizing toxic gases as recited in claim 5, wherein the binder is silica sol (4.3-7.3 wt %), CMC (Sodium Carboxy Methyl Cellulose) or pulp particles (4.7-7.3 wt %).

7. The apparatus for purifying and neutralizing toxic gases as recited in claim 5, wherein a pore volume of the first pellet is in a range of 1.91-2.17 cc/g, a BET surface area thereof is in a range of 920-970 m2/g, and a pressure drop thereof is in a range of 8.8-9.3 mmAq/(5 cm); the pore volume of the second pellet is in a range of 1.02-1.18 cc/g, the BET surface area thereof is in a range of 766-792 m2/g, and the pressure drop thereof is in a range of 7.6-8.4 mmAq/(5 cm); and the pore volume of the third pellet is in a range of 1.57-1.69 cc/g, the BET surface area thereof is in a range of 788-823 m2/g, and the pressure drop thereof is in a range of 7.7-8.2 mmAq/(5 cm).

8. The apparatus for purifying and neutralizing toxic gases as recited in claim 1, wherein the second filter is the non-woven fabric filter which is coated and fixed with 70-85 wt % of the activated charcoal, 10-25 wt % of the basic metal oxide and 3-8 wt % of a binder uniformly or the non-woven activated carbon fiber filter which is coated and fixed with 80-95 wt % of the basic metal oxide and 5-20 wt % of the binder uniformly.

9. The apparatus for purifying and neutralizing toxic gases as recited in claim 1, wherein the intake is a cone-shaped intake communicated with a flexible pipe, which is formed on an upper surface of the main body, the exhaust is formed on a lower portion of the main body, the control panel is the upper surface or a front surface of the main body, a grip is formed on one side of the upper surface of the main body, and a caster is formed on a lower portion of the main body.

10. The apparatus for purifying and neutralizing toxic gases as recited in claim 9, wherein a grip pin is formed at an upper end portion of the cone-shaped intake communicated with the flexible pipe.

11. The apparatus for purifying and neutralizing toxic gases as recited in claim 1, wherein the intake has a plurality of guide pins formed at an upper portion of a front surface of the main body, the exhaust has a plurality of other guide pins formed at a lower portion of the front surface of the main body, the control panel is formed on the front surface of the main body, and a height adjustor is formed on a lower surface of the main body.

12. The apparatus for purifying and neutralizing toxic gases as recited in claim 1, wherein the intake has a plurality of guide pins formed at a lower portion of a front surface of the main body, the exhaust has a plurality of other guide pins formed at an upper portion of the front surface of the main body the control panel is formed on the front surface of the main body, and a height adjustor is formed on a lower surface of the main body.

* * * * *